(12) United States Patent
Gaillard et al.

(10) Patent No.: US 11,789,553 B2
(45) Date of Patent: Oct. 17, 2023

(54) 3D CONTROL DEVICE FOR CAPACITIVE TOUCH INTERFACE

(71) Applicant: HAP2U, Saint Martin d'Hères (FR)

(72) Inventors: Maxime Gaillard, Saint Martin d'Hères (FR); Mickaël Cottin-Bizonne, Saint Martin d'Hères (FR); Bruno Challiol, Saint Martin d'Hères (FR); Simon Rouillere, Saint Martin d'Hères (FR)

(73) Assignee: HAP2U, Saint Martin d'Hères (FR)

( * ) Notice: Subject to any disclaimer, the term of this patent is extended or adjusted under 35 U.S.C. 154(b) by 0 days.

(21) Appl. No.: 17/621,445

(22) PCT Filed: Jul. 3, 2020

(86) PCT No.: PCT/FR2020/000197
§ 371 (c)(1),
(2) Date: Dec. 21, 2021

(87) PCT Pub. No.: WO2021/005274
PCT Pub. Date: Jan. 14, 2021

(65) Prior Publication Data
US 2022/0253158 A1    Aug. 11, 2022

(30) Foreign Application Priority Data

Jul. 5, 2019  (FR) ...................................... 1907542

(51) Int. Cl.
*G06F 3/039* (2013.01)
*G06F 3/01* (2006.01)
*G06F 3/044* (2006.01)

(52) U.S. Cl.
CPC ............ *G06F 3/0393* (2019.05); *G06F 3/016* (2013.01); *G06F 3/017* (2013.01); *G06F 3/044* (2013.01)

(58) Field of Classification Search
CPC ........ G06F 3/016; G06F 3/017; G06F 3/0393; G06F 3/044; G06F 3/0362
See application file for complete search history.

(56) References Cited

U.S. PATENT DOCUMENTS

2006/0012584 A1*  1/2006  Vassallo .................. G06F 3/016
                                                      345/184
2013/0241822 A1*  9/2013  Sharma .................. G06F 3/0425
                                                      345/156

(Continued)

FOREIGN PATENT DOCUMENTS

WO    2008116980 A1    10/2008
WO    2017168010 A1    10/2017

OTHER PUBLICATIONS

Machine translation of FR 3 072 478 (Year: 2022).*
(Continued)

*Primary Examiner* — Michael Pervan
(74) *Attorney, Agent, or Firm* — BUCHANAN INGERSOLL & ROONEY PC

(57) ABSTRACT

The invention relates to a control device of a capacitive touch surface capable of detecting the position or movement of at least one finger or a control stylus of a user in the proximity of the capacitive touch surface. The device includes a three-dimensional control member secured to the capacitive touch surface and provided with an electrically insulating body having a lower surface facing the capacitive touch surface and a three-dimensional surface intended to be touched or scanned by at least one finger or a stylus of a user. The three-dimensional control member is provided with a plurality of electrical conductors separated in pairs by an electrically insulating space and configured to exchange electrical charges with the capacitive touch surface when a user touches or swipes the three-dimensional surface, such (Continued)

that a user can interact with the capacitive touch surface via the three-dimensional control member.

24 Claims, 8 Drawing Sheets

(56) References Cited

U.S. PATENT DOCUMENTS

2014/0168132 A1\*  6/2014  Graig ................... G06F 3/0362
                                                                 345/174
2016/0364059 A1\* 12/2016  Chan ....................... G06F 3/016
2017/0031558 A1   2/2017  Ellman et al.
2018/0314357 A1  11/2018  Klein et al.

OTHER PUBLICATIONS

Machine translation of WO 2008/116980 (Year: 2022).\*
Machine translation of WO 2017/168010 (Year: 2022).\*
International Search Report (PCT/ISA/210) with translation and Written Opinion (PCT/ISA/237) dated Sep. 8, 2020, by the European Patent Office as the International Searching Authority for International Application No. PCT/FR2020/000197.

\* cited by examiner

3D CONTROL DEVICE FOR CAPACITIVE TOUCH INTERFACE

FIELD OF THE INVENTION

The invention relates to control interfaces using a capacitive touch interface with which a user is able to interact in order to control a device or an electronic appliance. The invention is applicable in particular, but not exclusively, in the field of industrial equipment, or in the automotive field.

PRIOR ART

Manual controls currently consist mainly of various types of mechanical buttons, or 2D touch screens associated with mechanical actuators.

The majority of manual control members in industry, such as control knobs, buttons and sliders, require movable mechanical elements integrated into the object or the machine to be controlled in order to allow rotation of the control member or even a longitudinal movement along an axis. These manual control members, such as knobs, sliders or the like generally comprise a part able to move via a ball-bearing system, a movable rail, or a magnetorheological fluid (material whose rigidity depends on the magnetic field applied).

Document WO 2017/168010 A1 also discloses a control interface for a motor vehicle dashboard. This comprises a gripping member or button, able to move in rotation about a guide, and provided with a metal index for informing a capacitive panel of the angular position of the movable gripping member. The movable button has a cover in the form of a rim in the vicinity of the capacitive panel so as to prevent the fingers of a user from coming too close to the touch panel and interfering with the detection of the angular position of the metal index.

It results from this structure that, with the button being movable, it does not make it possible to detect the position of a finger with respect to the capacitive panel. It makes it possible only to detect the presence of a finger and the movement of the movable button with respect to the capacitive panel. In summary, known devices therefore implement mechanical movable elements that are expensive to produce and the wear of which due to use limits service life, thereby requiring expensive replacement or maintenance operations. In addition, they do not make it possible to directly detect the position or the movement of one or more fingers with respect to a touch panel without the involvement of a movable element.

AIM OF THE INVENTION

The general aim of the invention is in particular to provide a control member that does not exhibit the drawbacks of known control devices.

Another specific aim of the invention is to provide a control device capable, in the long term, of eliminating the majority of knobs and sliders comprising movable mechanical parts, such as ball bearings or the like.

Another aim of the invention is to provide a touch-based control interface with or without haptic feedback, which is tangible, that is to say which has a three-dimensional structure that is easy for the fingers of a user to manipulate in order to detect the position of the finger of a user interacting with a tangible three-dimensional object the non-conductive body (plastic or wooden part for example) of which is attached above a touch panel by adhesive bonding.

Another aim of the invention is to provide a modular control member that is easily able to be adapted to several types of touch surface through simple programming.

Another aim of the invention is to provide a highly economical device that makes it possible to reuse existing capacitive touch interfaces, simply by adding thereto a completely passive 3D element able to transfer the touch-based detection of a 2D touch panel to a 3D touch member offering easier gripping.

SUMMARY OF THE INVENTION

The invention consists in principle in providing a three-dimensional (denoted 3D) control member associated with a capacitive-effect 2D touch surface.

The three-dimensional control member is fixed and is joined to the 2D touch surface by way of a double-sided adhesive or an epoxy-type polymer glue for example. The adhesive may be chosen so as to transmit an ultrasonic vibration to the 3D control member, making it possible to modulate an ultrasonic lubrication effect (called "squeeze film" effect) between the haptic feedback surface and the 3D control member.

The rigid 3D control member detects the position of the finger of the user (or of a stylus) above or near the 2D touch surface. The 3D control member may be completely passive, that is to say without an electric power supply and without an electronic component or active sensor.

The 3D control member is provided with electrical conductors that transmit electric charges from the 2D touch surface to the contours of the 3D control member, such that the user is able to interact with the capacitive 2D touch surface via the 3D control member without directly touching the 2D touch surface.

One subject of the invention is therefore a control device for a capacitive touch surface able to detect the position or the movement of at least one finger or of a control stylus of a user near the capacitive touch surface, characterized in that it comprises a three-dimensional control member fixed with respect to said capacitive touch surface and provided with an electrically insulating body having a lower surface placed facing the capacitive touch surface and a three-dimensional surface intended to be touched or swiped by at least one finger or a stylus of a user, the three-dimensional control member being provided with a plurality of electrical conductors that are separated in pairs by an electrically insulating space and configured so as to exchange electric charges with said capacitive touch surface when a user touches or swipes the three-dimensional surface, such that a user is able to interact with the capacitive touch surface via the three-dimensional control member.

According to one embodiment, each electrical conductor comprises a body, a surface and/or an upper end that are intended to come into contact with a finger or a control stylus of a user, and a lower end intended to be placed facing the touch surface so as to exchange electric charges therewith through a capacitive effect.

Advantageously, the three-dimensional control member is completely passive and is not connected to any electric power source and to any active electronic component.

According to one embodiment, the three-dimensional control member does not comprise any movable mechanical part.

According to one embodiment, the capacitive touch surface is a touch display screen or a touchpad without a screen.

According to one embodiment, the three-dimensional control member is fixed to the touch surface by way of a glue or an adhesive.

According to one variant embodiment, the three-dimensional control member is able to be moved relative to the touch surface in order to be able to interact successively with various areas thereof while still remaining fixed during operation thereof.

According to one embodiment, the three-dimensional control member is in the form of a cylindrical, frustoconical or conical ring, of a solid cylindrical, frustoconical or conical pad, of a parallelepipedal or semi-cylindrical bar, or even of a three-dimensional element having a flat lower surface and a three-dimensional upper surface of any shape.

According to one embodiment, the electrical conductors are produced in the form of tracks extending between the upper surface and the lower surface of the three-dimensional control member.

Preferably, the three-dimensional control member is fully coated with an insulating resin layer able to protect and mask the electrical conductors, the thickness of the resin layer being chosen so as to leave a capacitive effect between the electrical conductors and the finger or the control stylus.

Preferably, the electrical conductors are spaced in pairs by a distance smaller than the contact surface of a finger or of a control stylus, such that the end of a finger or of a control stylus simultaneously faces at least two adjacent electrical conductors.

Preferably, on the upper surface of the three-dimensional control member, the electrical conductors are spaced in pairs by an interval of between 0.1 mm and 10 mm.

Preferably, on the lower surface of the three-dimensional control member, the adjacent electrical conductors are spaced in pairs by an interval determined on the basis of the resolution of the capacitive touch surface, and have a surface area of between 2 mm$^2$ and 100 mm$^2$.

According to some embodiments, the electrical conductors are in particular made of copper, silver, gold, aluminum, carbon, tin, nickel, metal alloys, or conductive, transparent or opaque ink.

According to one embodiment, the three-dimensional control member is made of a non-electrically conductive material, in particular a viscoelastic material such as plastic or wood, or an elastic material such as glass, porcelain, ceramic or stone.

According to one advantageous embodiment, the capacitive touch surface is a haptic-feedback panel able to be set into vibration by electromechanical actuators controlled by drive electronics so as to generate an ultrasonic lubrication effect on the panel. In this case, the three-dimensional control member is fixed to the capacitive touch surface such that the capacitive touch surface is able to communicate the vibrations of the ultrasonic lubrication effect to the fingers of the user via the three-dimensional control member. To this end, the three-dimensional control member is fixed to the capacitive touch surface by way of an appropriate adhesive of double-sided adhesive or resin type, for example an adhesive having a Young's modulus of between 50 MPa and 5 GPa at room temperature and a vibrational frequency of between 20 kHz and 200 kHz.

In this embodiment, the electromechanical actuators consist of piezoelectric ceramics controlled at frequencies of between 20 kHz and 200 kHz.

Another subject of the invention is any capacitive touch-based control system comprising a control device as described above.

According to one variant, the system may be configured such that the movement of a finger of a user over the upper ends or along the electrical conductors of the three-dimensional control member is interpreted by a control unit, which causes information to be displayed on all or part of said screen. In addition, the three-dimensional control member may consist of a transparent or translucent material able to form a light guide, such that the information displayed on the screen is relayed to the surface of the light guide.

DETAILED DESCRIPTION

The invention will be described in more detail with the aid of the figures, in which:

FIG. 1 is an overview of the control device 1 according to the invention, in an elevated and sectional view.

Figure 1:
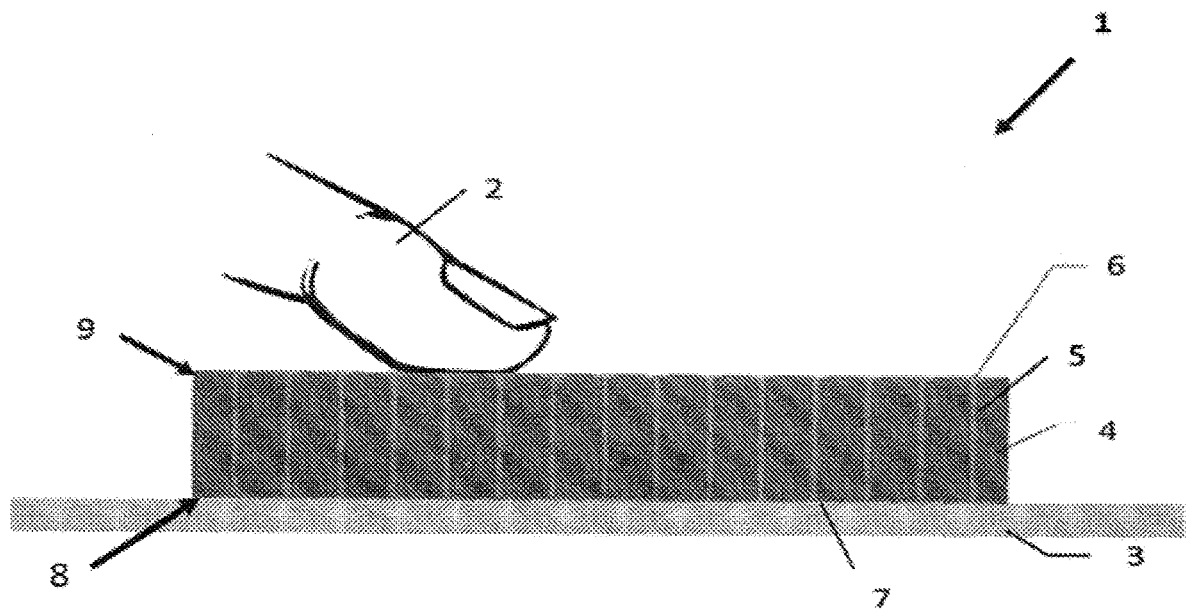
FIG. 1 is an overview of the 3D control device according to the invention, in an elevated and sectional view.

It is known that capacitive touch surfaces, such as the touch surface 3 shown in FIG. 1, comprise a layer or a grid that accumulates electric charges. When the user touches the touch surface 3 or brings a finger 2 or a stylus close to it, some of these electric charges are transferred thereto. The sensor system of the touch surface detects the value of this charge loss, thereby making it possible, in a known manner, to locate the point of contact of the user with the touch surface.

The underlying principle of the invention consists in no longer directly touching the touch surface 3, but in transferring the electric charges to a three-dimensional transfer member 4 placed above the capacitive panel 3, thereby making it possible to make the touch surface more tangible to the user, due to the three-dimensional member 4 and its three-dimensional gripping surface 9, Thus, when the user touches the three-dimensional surface 9 of the three-dimensional member 4, including in particular its upper surface and its side surfaces, some of the charges of the touch-sensitive surface 3 are transferred to the finger 2 via the three-dimensional transfer member 4.

In order that the location by the touch surface 3 of the contact area of the finger 2 of the user on the three-dimensional member 4 corresponds to that of a direct touch on the touch surface 3 without a transfer member, the three-dimensional member 4 itself is non-conductive, but it comprises a set of electrical conductors 5 insulated from one another and extending between the lower surface 8 and the three-dimensional surface 9 of the three-dimensional member 4, accessible to the fingers or a stylus of a user.

The electrical conductors 5 allow electric charges to be transferred between the three-dimensional surface 9 of the three-dimensional member 4 and the capacitive touch surface 3 by virtue of the three-dimensional surface 9 being equipped with electrical conductors 5 able to come into direct contact with the one or more fingers of the user. Likewise, a capacitive transfer may take place between the finger and any area of the three-dimensional surface 9 equipped with conductive tracks 5 able to be in contact with the finger (edges, rims, inner or outer surface in the case of a ring, etc.). The position of one or more fingers of the user on the control member 4 may thus be detected by capacitive exchanges between the capacitive panel 3 and various areas of the three-dimensional surface 9 of the control member 4.

In order that the finger 2 on the three-dimensional control member 4 is detected correctly, the electrical conductors 5 have dimensions and spacings that are adapted according to the shape of the 3D member and the desired detection accuracy. The upper end 6 of the conductors 5 may thus for example have the form of a copper pad or pad of another electrically conductive material, preferably covered by a layer of varnish for protecting against tearing or mechanical wear caused by contact with fingers.

The spacing between two electrical conductors 5 or between their upper ends 6 should be small enough to allow two electrical conductors 5, or the upper ends 6 thereof, to be touched at the same time by a finger. A spacing of between 0.1 mm and 10 mm will work in most cases.

Similarly, the dimension and the spacing of the lower ends 7 of the conductors 5 are adapted according to the resolution of the capacitive panel 3. In order for the detection of the position of the finger 2 by the touch surface 3 to work correctly, the lower ends 7 of the conductors 5 have for example a surface area of between 2 $mm^2$ and 100 $mm^2$, which is suitable in most cases.

The body of the conductors 5 makes it possible to connect the upper ends 6 of the conductors 5 to the lower ends 7 that are intended to interact with the capacitive surface 3 through capacitive coupling. This may be for example a metal wire made of copper or the like, or a transparent or non-transparent electrically conductive track.

It should be noted that the three-dimensional control member 4 is completely passive and is not connected to any electric power source and to any active electronic component, thereby guaranteeing that the device is extremely simple and reliable.

It should also be noted that the three-dimensional control member 4 does not comprise any movable mechanical part, thereby ensuring that the device is robust and inexpensive.

Figure 2:
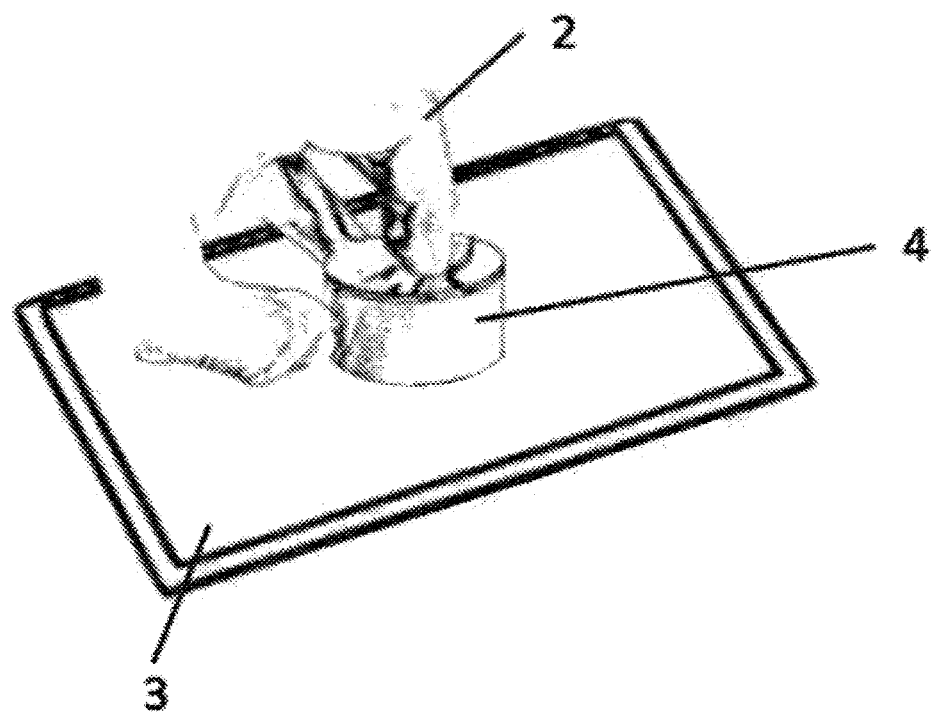
FIG. 2 is a perspective view of the control device according to the invention, used on a capacitive touch panel.

In addition, it is important to note that, when it is actuated by the user, the three-dimensional control member 4 is completely fixed with respect to the capacitive touch surface 3. It is for example fixed by adhesive bonding in an appropriate area of the touch surface 3, as shown schematically for example in FIG. 2. According to one variant, it may be fixed temporarily and able to be moved as needed between several successive positions on the touch surface if there is successive interaction with different areas of the touch surface. However, during operation, it is always fixed and positioned at a specific location on the touch surface 3.

The three-dimensional control member 4 is compatible with what is called "multitouch" use, that is to say using several fingers at the same time, as is the capacitive touch surface 3. This may be a capacitive touch-based display screen, or a touchpad without a screen.

The three-dimensional control member 4 may adopt a virtually unlimited number of shapes and dimensions compatible with contact by one or more fingers or with a stylus. Some practical shapes are shown, by way of completely non-limiting indication, in FIGS. 3 to 7.

Figure 3A:
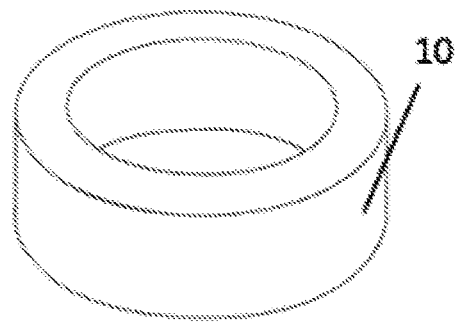
FIGS. 3A and 3B are perspective views of a control member in the form of a ring or of a solid cylindrical pad.
Figure 3B:
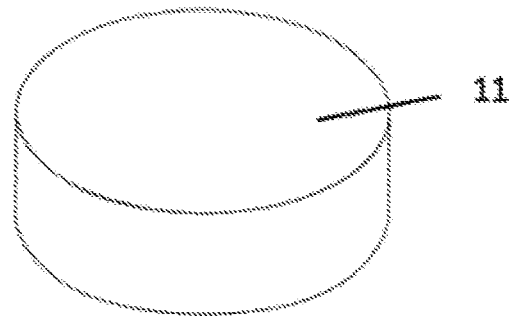

FIGS. 3A and 3B respectively show a cylindrical ring 10 and a solid cylindrical pad 11, which may both be used to produce the three-dimensional member 4, on the condition that they are provided with electrical conductors 5.

FIGS. 3C to 3L thus show several exemplary embodiments using the cylindrical ring 10 covered with a set of electrical conductors 5.

Figure 3C:
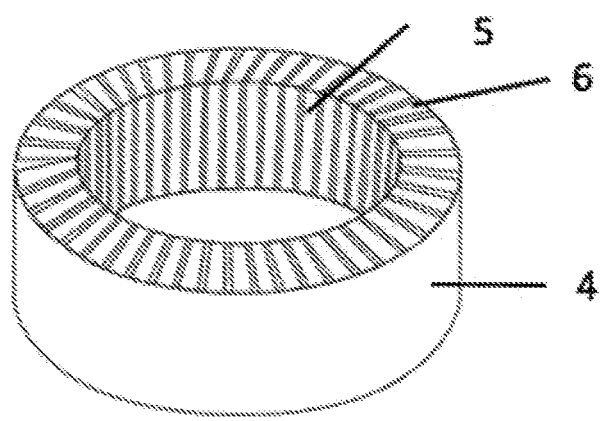
FIG. 3C is a perspective view of a first embodiment of a control member according to the invention, in the form of a cylindrical ring.

In FIG. 3C, the electrical conductors 5 are formed on the inner face of the cylindrical ring 10, and an upper end 6 of each conductor 5 is connected to a lower end 7 thereof (not shown). The user may then move one or more fingers over the upper face of the ring and run through the upper ends 6 of the conductors 5, or else move his finger over the inner face of the ring. The corresponding lower ends 7 will interact with the capacitive touch surface 3 through a capacitive effect, and everything takes place as though the user were directly touching the areas in question of the capacitive touch surface 3.

Figure 3D:
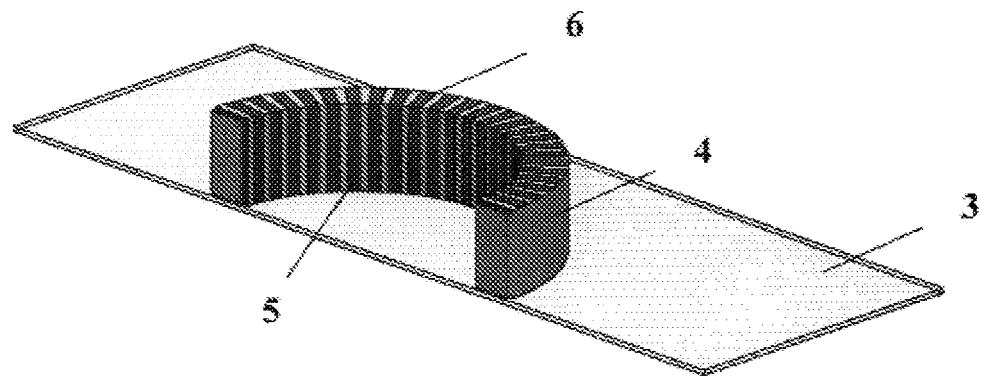
FIGS. 3D and 3E are sectional and perspective views, from above and below, of a control member according to FIG. 3C, positioned on a touch panel.
Figure 3E:
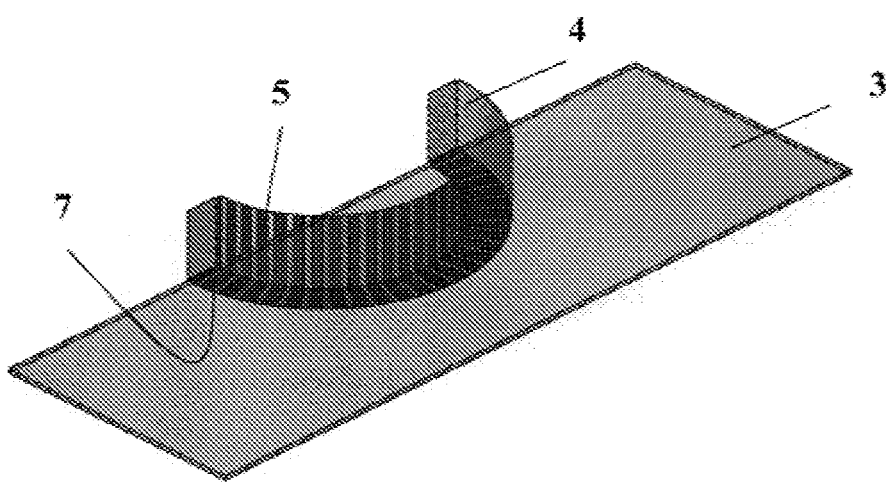

FIGS. 3D and 3E show a sectional and perspective view of the ring from FIG. 3C, fixed on a capacitive touch panel 3. FIG. 3D shows the electrical conductors 5 arranged on the inner face of the ring, and their upper ends 6. FIG. 3E shows the electrical conductors 5 arranged on the inner face of the ring, and their lower ends 7.

Figure 3F:
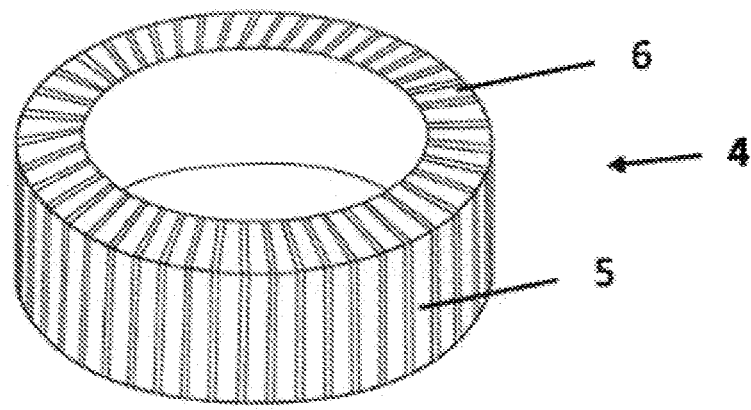
FIG. 3F is a perspective view of a second embodiment of a control member according to the invention, in the form of a cylindrical ring.
Figure 3G:
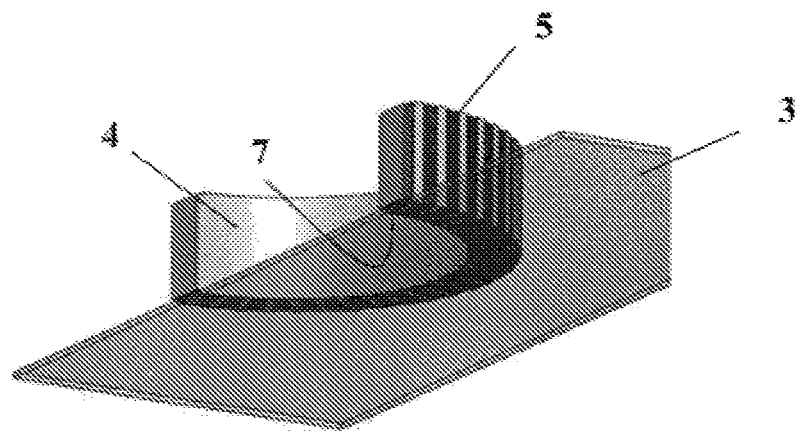
FIGS. 3G and 3H are sectional and perspective views, from above and below, of a control member according to FIG. 3F, positioned on a touch panel.
Figure 3H:
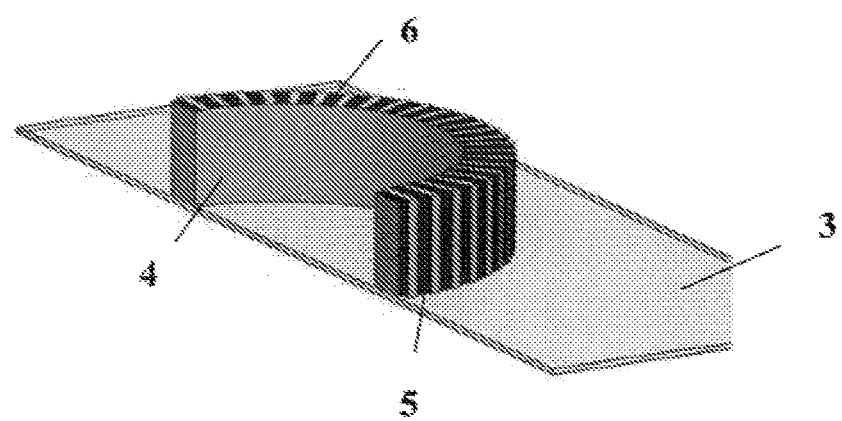

FIG. 3F shows a variant of the cylindrical ring 10 from FIG. 3A, this time with electrical conductors 5 positioned on the outer face of the cylindrical ring 10. FIG. 3G shows the electrical conductors 5 arranged on the outer face of the ring, and their lower ends 7. FIG. 3H shows the electrical conductors 5 arranged on the outer face of the ring 10, and their upper ends 6.

Figure 3I:
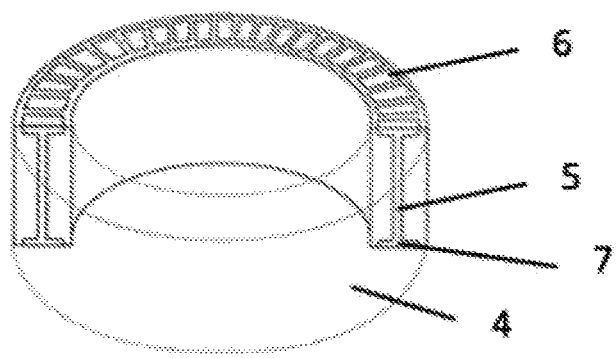
FIG. 3I is a sectional and perspective view of a third embodiment of a control member according to the invention, in the form of a cylindrical ring.

In another variant shown in FIG. 3I, a three-dimensional control member 4 in the form of a cylindrical ring 10 continues to be used, in association with a capacitive panel, but electrical conductors 5 are this time arranged inside the body of the cylindrical ring.

Figure 3J:
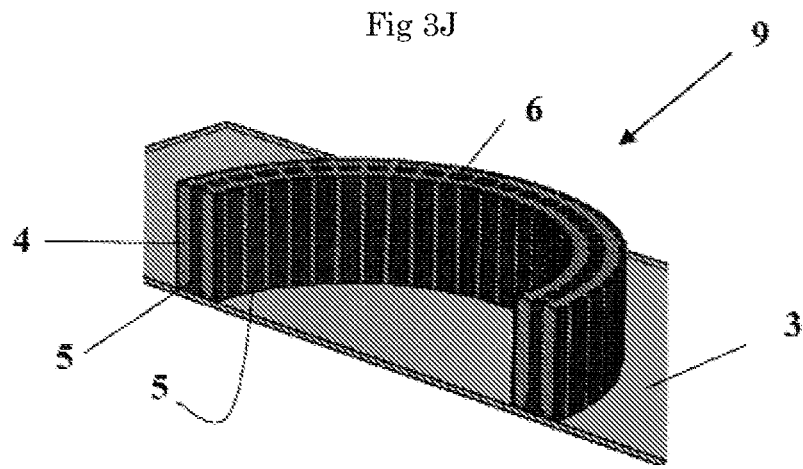
FIGS. 3J and 3K are sectional and perspective views, from above and below, of another embodiment of a control member in the form of a cylindrical ring, positioned on a touch panel.
Figure 3K:
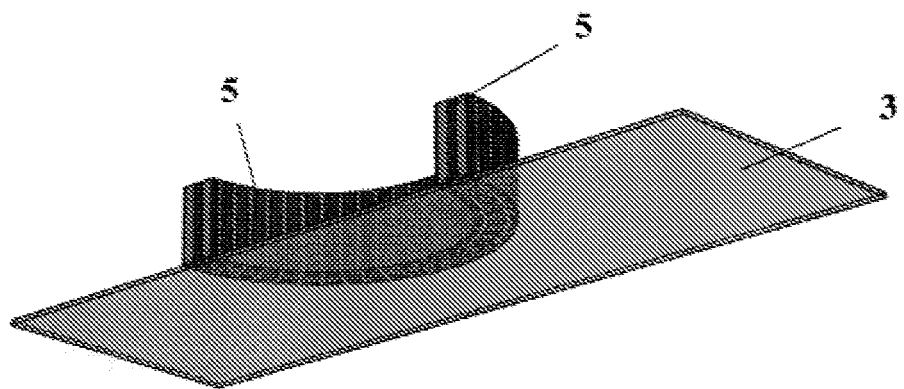
Figure 3L:
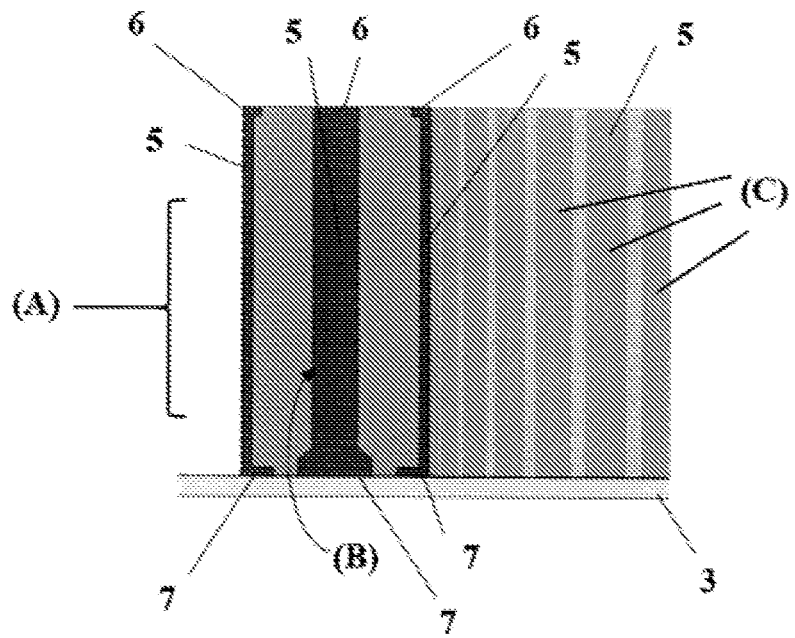
FIG. 3L is a detailed sectional view of a control member according to FIGS. 3J and 3K.

In one even more sophisticated variant shown in FIGS. 3J and 3K, electrical conductors 5 are arranged inside the body of the cylindrical ring (as in FIG. 3I), but also on the inner walls of the ring 10 (as in FIGS. 3C to 3E) and on the outer walls of the ring 10 (as in FIGS. 3F to 3H). As may be seen in FIG. 3L, this then gives three sets A, B, C of electrical conductors 5, specifically a set A of conductors 5 located on the outer face of the ring 10, a set B of conductors 5 located inside the body of the ring, and a set C of conductors 5 located on the inner face of the ring 10. And all of the conductors 5 of each set A, B, C are electrically insulated from one another and insulated from the conductors 5 of the other sets of conductors.

By virtue of this structure, it becomes possible to use the various sets A, B, C of electrical conductors 5 separately or in combination, so as to detect the position or the movement of several fingers of a user, thereby making it possible to considerably enrich the number of functions and possible uses of the device.

For example, following contact or swiping of a finger on the conductors 5 of a first set A of conductors, the control unit of the device receives signals which it interprets as the rough setting of a parameter (for example a brightness display parameter for a screen). Similarly, following contact or swiping of a finger on the conductors of another set (B or C) of conductors 5, the control unit of the device receives signals, which it interprets as the fine setting of this same brightness parameter.

According to another usage example, the control unit will be configured so as to manage different parameters depending on whether the information about the position or movement of the fingers on the control device arrives there from a capacitive exchange with the sets of conductors A, B or C. Multiple scenarios for managing and controlling an application may thereby be implemented using one and the same control member according to the invention, associated with a control unit provided with a microprocessor and appropriate control software.

According to yet another exemplary usage mode, the control unit according to the invention may also specifically interpret contact of the finger of the user with several sets of different conductors (A, B and C): in such a scenario, when a capacitive exchange takes place simultaneously between the finger of the user and several sets of conductors 5, the control unit may for example interpret this interaction as an action to confirm a choice of an item in a menu or the selection of a value of a parameter. This scenario may in particular be implemented with a button of the type shown in FIG. 3J: when the finger is pressed on the upper face of the ring, the control unit receives the information about simultaneous contact with the conductors 5 forming vertical tracks on the outer face, vertical tracks on the inner face of the ring and tracks placed vertically in the body of the control member.

Monitoring or control units for interacting with a touch panel are well known in the prior art, for example in the field of touch phones or tablets, and will therefore not be described in more detail.

Figure 6A:
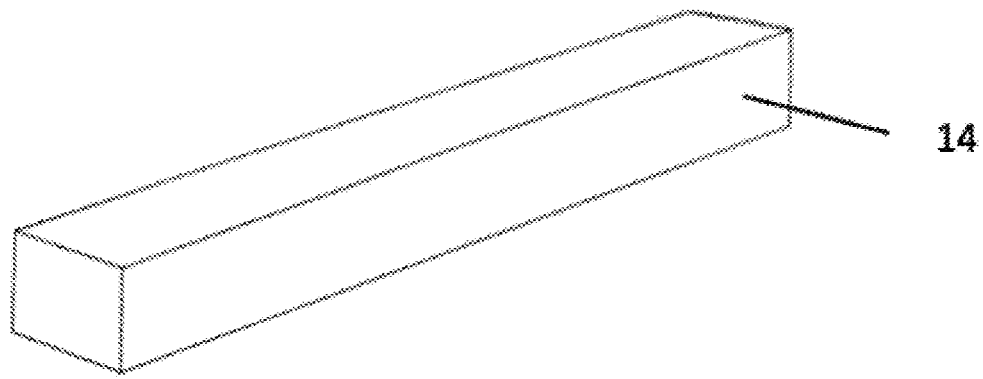
FIGS. 6A, 6B, 6C are perspective views of embodiments of the invention using parallelepipedal longitudinal bars.

It should be noted that the various embodiments of FIGS. 3A to 3L use a three-dimensional control member 4 in the form of a cylindrical ring 10, but other implementations of the invention may be obtained on a control member 4 in the form of a rectangular parallelepiped (such as the one shown in FIG. 6A). In one scenario that is not shown, provision could be made for a set A of conductors 5 positioned on a first longitudinal face of the parallelepiped, a set B of conductors 5 positioned on a second longitudinal face of the parallelepiped, and a set C of conductors 5 positioned on a third longitudinal face of the parallelepiped. It is then possible to form a "slider" or "slider button" that will manage different parameters depending on the areas touched or passed through by the user, or else that will make it possible to adjust one and the same parameter but to different scales depending on the areas of contact and capacitive exchange with the sets of electrical conductors A, B and/or C.

Figure 4A:
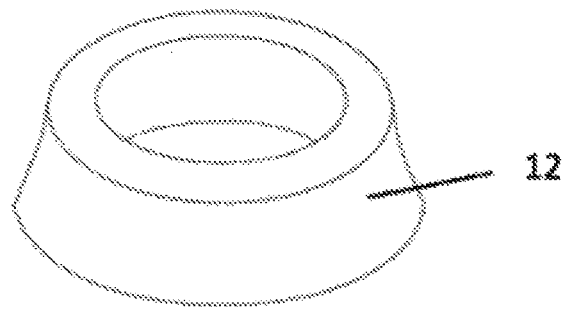
FIGS. 4A, 4B show perspective views of various embodiments of the invention using a frustoconical ring.
Figure 4B:
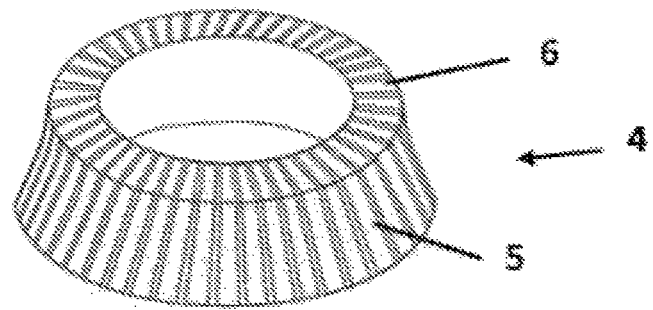

In FIGS. 4A and 4B, the three-dimensional member 4 is formed from a frustoconical ring 12 of variable height, the upper face of which has a diameter smaller than that of the lower face. This shape has the advantage of reducing direct contact between the end of the finger and the capacitive panel when gripping the button 4, this direct contact being able to interfere with the recognition of the position of the finger or its movement over the body of the three-dimensional member 4. However, a variant with an inverse geometry (not shown) is also possible, with a diameter of the upper face of the ring greater than that of the lower ring. This is particularly suitable when the surface area available for the member 4 on the capacitive touch surface 3 is small, smaller than the size of a finger.

Figure 5A:
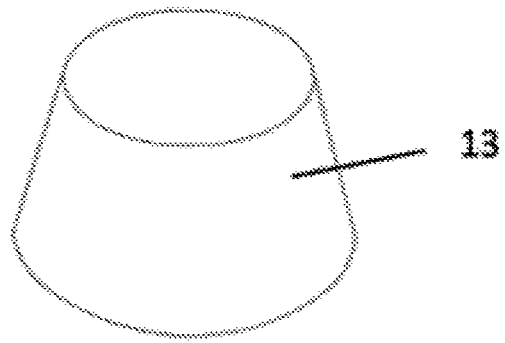
FIGS. 5A, 5B are perspective views of one embodiment of the invention using a solid frustoconical pad.
Figure 5B:
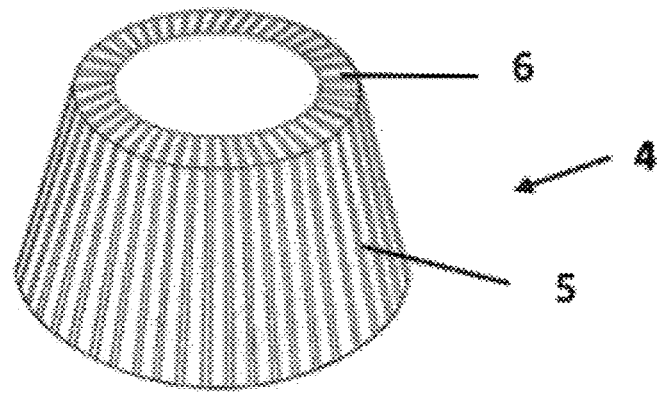

In FIGS. 5A and 5B, the three-dimensional member 4 is formed from a solid frustoconical pad 13 of variable height, the upper face of which has a diameter smaller than that of the lower face.

Figure 6B:
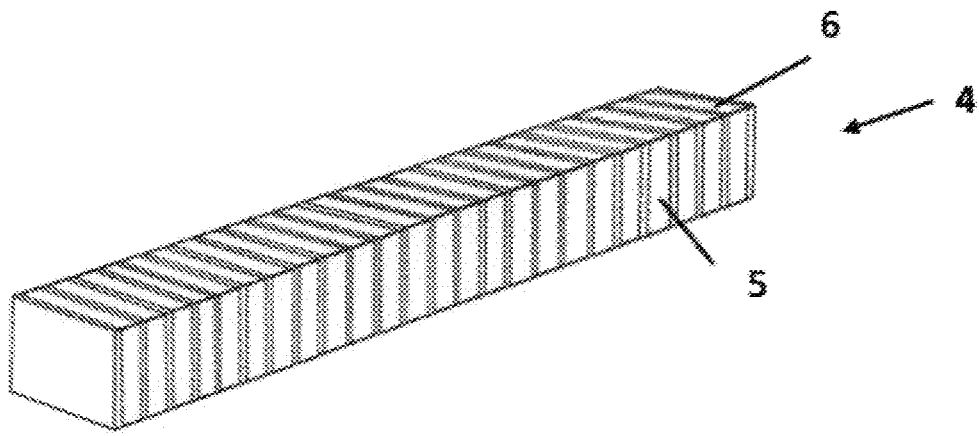
Figure 6C:
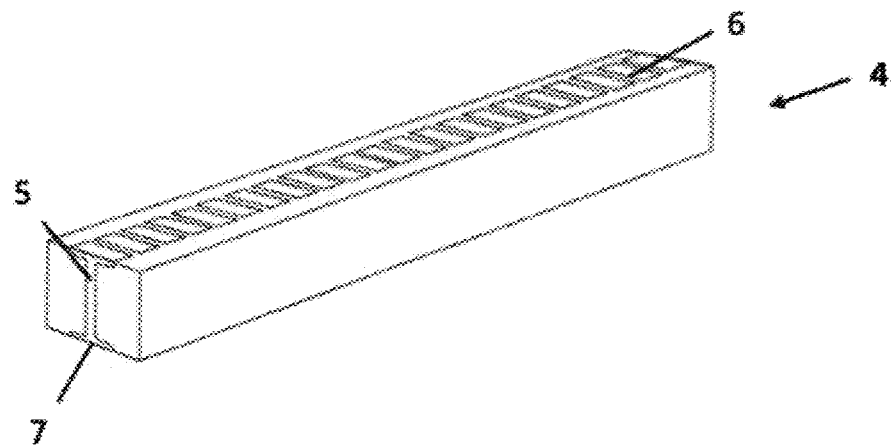

In FIGS. 6A to 6C, the three-dimensional control member 4 is formed from a parallelepipedal bar 14. The electrical conductors 5 are on the surface of the bar (FIG. 6B), or integrated into the body of the bar (FIG. 6C), and the upper and lower ends 6 and 7, respectively, of the conductors 5 are arranged on two opposing faces of the bar 14.

Figure 7A:
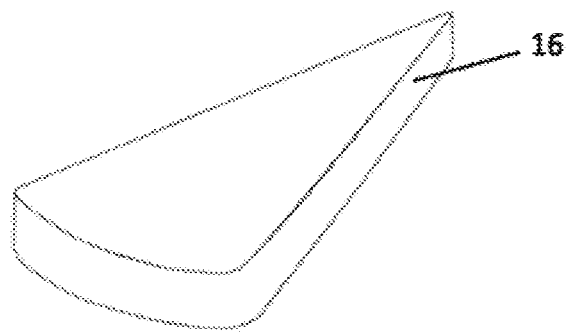
FIGS. 7A, 7B are perspective views of one embodiment of the invention using a triangular control member.
Figure 7B:
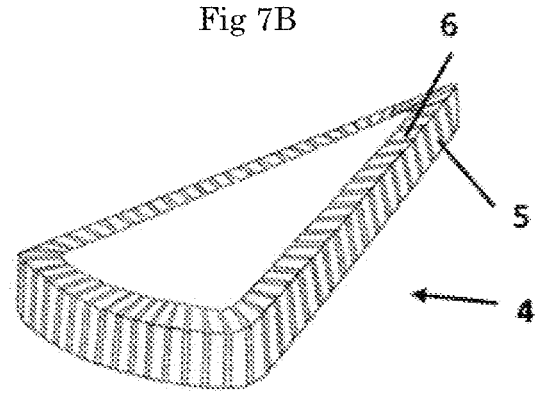

In FIGS. 7A, 7B, the control member 4 is formed from a cylindrical sector 16 and the conductors 5, along with their ends 6, 7, are arranged along the periphery of the cylindrical sector.

In all of the scenarios, shown or not shown, the user positions or moves one or more fingers on the ends 6 of the conductors 5 of the three-dimensional member 4, or over the length of the conductors 5 itself, and the capacitive touch surface 3 captures this contact or these movements as though they were performed directly on its surface.

According to one more sophisticated embodiment of the invention, the capacitive touch surface 3 may be a haptic-feedback touch surface, actuated by electromechanical actuators at an ultrasonic vibrational frequency in order to create standing Lamb waves there, as is known and described for example in document WO 2008/116980 A1.

The touch surface 3 is then actuated by a piezoelectric layer fixed to one of its faces.

Such a structure has at least one flexural mode characterized by a resonant frequency of between 20 kHz and 200 kHz, and comprises electric power supply means that are connected to the piezoelectric layer.

The piezoelectric layer and the electric power supply means are designed to excite a flexural mode of the vibrating touch surface and to generate standing Lamb waves there having an amplitude of the order of a micrometer.

As is known, the touch surface then makes it possible to reproduce, in a manner perceptible to a finger, very fine textures or roughnesses by modulating what is called the "squeeze film" or ultrasonic lubrication effect, thereby making it possible to modify the tactile sensation of touching the contact surface.

In some application environments, such as for example those of industrial equipment or in the automotive field, it would be more practical to obtain a haptic feedback effect through ultrasonic lubrication-based friction modulation not on a flat touch surface but on a more conventional 3D element.

However, simply providing a flat touch surface with a 3D protuberance completely changes the vibration of the plate, and in particular removes the ultrasonic lubrication-based haptic feedback effect in the plate by destroying the standing Lamb wave. To rectify this, it has been observed that adhesively bonding a three-dimensional control member 4 to the 3D element as described above, using an appropriate adhesive layer, made it possible to limit the impact of the presence of the 3D button on the vibratory mode while still allowing the ultrasonic vibration to be transmitted from the plate to the 3D element.

The control signal for controlling the piezoelectric actuators should then take into account the rigidity provided by the control member 4 as well as the viscoelastic behavior of the adhesive. The adhesive is chosen for its mechanical properties so as to preserve the vertical movement of the rigid 3D touch surface without significant damping.

Compatible adhesive bonds are those formed using double-sided adhesives or resins that make it possible to adhesively bond different materials. These are encountered for example in touch screens in order to link the various layers of the display and the touch sensor to one another. They typically have a Young's modulus of between 50 MPa and 5 GPa at room temperature.

In this embodiment, the three-dimensional control member should be made from a rigid material compatible with establishing an A0 Lamb wave resonance mode: metal, glass, wood, rigid plastic or the like.

It is possible to perceive the vibration of the touch surface 3 at the surface of the control member 4 even for a completely passive member or button that does not have any electronic component.

According to another advantageous embodiment of the invention, the capacitive touch surface 3 is formed by a display screen, and the system is configured such that the movement of a finger of a user on the electrical conductors 5 of the three-dimensional surface 9 of the three-dimensional control member 4 causes information to be displayed on all or part of said screen, for example the part of the screen located in the center of the control member 4 when the latter is in the shape of a cylindrical ring 10 or frustoconical ring 12. This would allow the user to see, directly on the screen, the effect of his interaction with the control member 4, for example the variation of a system settings parameter.

It is also feasible for the three-dimensional control member 4 to be formed by a transparent or translucent material able to form a light guide, such that the information displayed on the screen is relayed to the surface of the light guide, for example in the form of a color variation linked to the variation of a parameter under the effect of the action on the three-dimensional control member 4.

Advantages of the Invention

The invention meets the stated aims.

In particular, it makes it possible to make control buttons more reliable by making them fixed and eliminating their movable mechanical parts. It makes it possible to equip haptic-feedback or non-haptic-feedback capacitive touch surfaces with a 3D control member that is highly tangible, interactive and completely passive, which makes it possible to use the touch surface to perform the same functions as those that the user usually performs by bringing one or more fingers close to the capacitive touch surface: pointing, selecting and executing an application displayed on the screen, setting one or more parameters of a display, etc.

The control device according to the invention is particularly economical to implement, since it involves only the use of a solid, rigid and fixed button provided with conductive tracks between its three-dimensional surface and its lower surface, and an adhesive.

The invention claimed is:

1. A control device for a capacitive touch surface able to detect the position or the movement of at least one finger or of a control stylus of a user near the capacitive touch surface, comprising a three-dimensional control member fixed with respect to said capacitive touch surface and provided with an electrically insulating body having a lower surface placed facing the capacitive touch surface and a three-dimensional surface intended to be touched or swiped by at least one finger or a stylus of a user, the three-dimensional control member being provided with a plurality of electrical conductors that are separated in pairs by an electrically insulating space and configured so as to exchange electric charges with said capacitive touch surface when a user touches or swipes the three-dimensional surface, such that a user is able to interact with the capacitive touch surface via the three-dimensional control member.

2. The control device as claimed in claim 1, wherein each electrical conductor or an upper end thereof is configured to come into contact with a finger or a control stylus of a user, and wherein the lower end of each electrical conductor is placed facing the capacitive touch surface so as to exchange electric charges therewith through a capacitive effect.

3. The control device as claimed in claim 2, wherein the electrical conductors are spaced in pairs by a distance smaller than the contact surface of a finger or of a control stylus, such that the end of a finger or of a control stylus simultaneously faces at least two adjacent electrical conductors.

4. The control device as claimed in claim 1, wherein the three-dimensional control member is completely passive and is not connected to any electric power source and to any active electronic component.

5. The control device as claimed in claim 1, wherein the three-dimensional control member does not comprise any movable mechanical part.

6. The control device as claimed in claim 1, wherein the capacitive touch surface is a touch display screen or a touchpad without a screen.

7. The control device as claimed in claim 1, wherein the three-dimensional control member is fixed to the touch surface by way of a glue or an adhesive.

8. The control device as claimed in claim 1, wherein the three-dimensional control member is able to be moved over the touch surface in order to be able to interact successively with various areas thereof.

9. The control device as claimed in claim 1, wherein the three-dimensional control member is in the form of a cylindrical, frustoconical or conical ring, of a solid cylindrical, frustoconical or conical pad, of a parallelepipedal or semi-cylindrical bar, or of a three-dimensional element having a flat lower surface and a three-dimensional surface of any shape.

10. The control device as claimed in claim 1, wherein the electrical conductors are produced in the form of tracks extending between the three-dimensional surface and the lower surface of the three-dimensional control member.

11. The control device as claimed in claim 1, wherein the three-dimensional control member is fully coated with an insulating resin layer able to protect and mask the electrical conductors, the resin layer having a thickness that provides a capacitive effect between the electrical conductors and the finger or the control stylus.

12. The control device as claimed in claim 1, wherein, on the three-dimensional surface of the three-dimensional control member, the electrical conductors are spaced in pairs by an interval of between 0.1 mm and 10 mm.

13. The control device as claimed in claim 1, wherein, on the lower surface of the three-dimensional control member, the adjacent electrical conductors are spaced in pairs by an interval determined on the basis of the resolution of the capacitive touch surface, and have a surface area of between 2 mm² and 100 mm².

14. The control device as claimed in claim 1, wherein the electrical conductors are made of copper, silver, gold, aluminum, carbon, tin, nickel, metal alloys, or conductive, transparent or opaque ink.

15. The control device as claimed in claim 1, wherein the three-dimensional control member is made of a non-electrically conductive viscoelastic material such as plastic or wood, or of a non-electrically conductive elastic material such as glass, porcelain, ceramic or stone.

16. The control device as claimed in claim 1, wherein the capacitive touch surface is a haptic-feedback panel able to be set into vibration by electromechanical actuators controlled by drive electronics so as to generate an ultrasonic lubrication effect on the panel.

17. The control device as claimed in claim 16, wherein the three-dimensional control member is fixed to the capacitive touch surface such that the capacitive touch surface is able to communicate the vibrations of the ultrasonic lubrication effect to the fingers of the user via the three-dimensional control member.

18. The control device as claimed in claim 17, wherein the three-dimensional control member is fixed to the capacitive touch surface by way of an adhesive of double-sided adhesive or resin type, having a Young's modulus of between 50 MPa and 5 GPa at room temperature and a vibrational frequency of between 20 kHz and 200 kHz.

19. The control device as claimed in claim 1, wherein the electromechanical actuators comprise piezoelectric ceramics controlled at frequencies of between 20 kHz and 200 kHz.

20. The control device as claimed in claim 1, further comprising a control unit provided with a microprocessor and with firmware configured so as to detect and interpret the position or the swiping movement of the fingers or of a stylus of a user on the electrical conductors of the three-dimensional control member and to deduce therefrom an action or a modification of the capacitive touch interface.

21. The control device as claimed in claim 20, wherein the electrical conductors are divided into several groups, and wherein the interaction between fingers or a stylus of a user and one or more groups of electrical conductors is interpreted by the control unit in order to manage a rough setting and a fine setting of one and the same parameter, or to manage several different parameters, or to confirm the choice of a parameter in a menu and select the value of this parameter.

22. A capacitive touch-based control system, comprising a control device as claimed in claim 1.

23. The system as claimed in claim 22, wherein the capacitive touch surface is a display screen, and wherein the system is configured such that the movement of a finger of a user over the electrical conductors of the three-dimensional control member causes information to be displayed on all or part of said screen.

24. The system as claimed in claim 23, wherein the three-dimensional control member comprises a transparent or translucent material able to form a light guide, and wherein the information displayed on the screen is relayed to the surface of the light guide.

* * * * *